US008903120B1

(12) United States Patent
Peasley

(10) Patent No.: US 8,903,120 B1
(45) Date of Patent: Dec. 2, 2014

(54) SYSTEM AND METHOD FOR PROVIDING AN IMAGE HAVING AN EMBEDDED MATRIX CODE

(75) Inventor: Maren Peasley, Eugene, OR (US)

(73) Assignee: Symantec Corporation, Mountain View, CA (US)

( * ) Notice: Subject to any disclaimer, the term of this patent is extended or adjusted under 35 U.S.C. 154(b) by 257 days.

(21) Appl. No.: 13/333,911

(22) Filed: Dec. 21, 2011

(51) Int. Cl.
*G06K 9/00* (2006.01)

(52) U.S. Cl.
USPC .......................................................... 382/100

(58) Field of Classification Search
CPC .................... G06K 19/06103; G06K 19/0614; H01L 21/30655; H01L 21/76898
USPC .......................................................... 382/100
See application file for complete search history.

(56) References Cited

U.S. PATENT DOCUMENTS

| 5,734,384 | A | * | 3/1998 | Yanof et al. | 345/424 |
| 7,738,673 | B2 | * | 6/2010 | Reed | 382/100 |
| 8,038,073 | B2 | * | 10/2011 | Burn | 235/494 |
| 8,371,511 | B2 | * | 2/2013 | Tokumaru | 235/494 |
| 2002/0181025 | A1 | * | 12/2002 | Yamaguchi | 358/3.28 |
| 2007/0153303 | A1 | * | 7/2007 | Abe et al. | 358/1.8 |
| 2009/0201544 | A1 | * | 8/2009 | Kumakura et al. | 358/1.15 |
| 2011/0026081 | A1 | * | 2/2011 | Hamada et al. | 358/1.18 |
| 2013/0021364 | A1 | * | 1/2013 | Azuma et al. | 345/589 |

FOREIGN PATENT DOCUMENTS

WO    WO2011118540    *   9/2011   ............ G06K 19/06

* cited by examiner

*Primary Examiner* — Tom Y Lu
(74) *Attorney, Agent, or Firm* — Lowenstein Sandler LLP

(57) ABSTRACT

A matrix code can be embedded into a digital image. In one embodiment, the present invention includes receiving a target image made of a plurality of pixels and a matrix code made of a plurality of dark and light cells. In one embodiment, a first set of pixels of the plurality of pixels of the target image is then associated with the dark cells, and a second set of pixels of the plurality of pixels of the target image is associated with the light cells. The matrix code can be embedded into the target image by darkening the first set of pixels and lightening the second set of pixels.

19 Claims, 7 Drawing Sheets

SYSTEM AND METHOD FOR PROVIDING AN IMAGE HAVING AN EMBEDDED MATRIX CODE

TECHNICAL FIELD

Embodiments of the present invention relate to matrix codes. Specifically, the embodiments of the present invention relate to presenting images and matrix codes.

BACKGROUND

Matrix codes, also referred to as "matrix barcodes," "two-dimensional codes," use black and white data cells to encode data in two dimensions. By contrast, a bar code uses black and white lines to encode data in only one dimension. There are many standardized variants of matrix codes in existence, some enjoying more popularity than others. For example, the Aztec Code and the Quick response ("QR") code are two very popular variants. Recently, matrix codes in general, and QR codes in particular have been more visible to consumers. The cameras on most Smartphone devices, such as iPhones™ and Droids™, can be used—in combination with application software—as matrix code scanners. Also, the ubiquity of mobile devices enabled airlines, for example, to issue virtual boarding passes as a QR code displayed by the traveler on their mobile device. Websites have also started to place various links and information on the Webpage in the form of matrix codes.

SUMMARY

In one embodiment, a method is provided comprising receiving a target image comprising a plurality of pixels, receiving a matrix code comprising a plurality of dark cells and a plurality of light cells, associating a first set of pixels of the plurality of pixels of the target image with the dark cells, associating a second set of pixels of the plurality of pixels of the target image with the light cells; and generating a coded image by embedding the matrix code into the target image by darkening the first set of pixels and lightening the second set of pixels. The method can further comprise including the coded image in a file representing a Web page, and providing the Web page to a client device in response to a request for the Web page.

In one embodiment, the method further includes providing a user interface to a user, wherein the user interface allows the user to select the target image from a plurality of images. In one embodiment, the user interface allows the user to input content to be encoded into the matrix code, wherein the method further comprises generating the matrix code using the content.

In one embodiment, the method further includes appending stuffing content to the content input by the user to increase the size of the content to be encoded into the matrix code. In one embodiment, the method further includes receiving a request for a Web page from a client device, generating content to be encoded into the matrix code using the received request, and generating the matrix code using the generated content. In one embodiment, darkening the first set of pixels and lightening the second set of pixels comprises creating a color value differential between the first set of pixels and the second set of pixels that is distinguishable to a matrix code scanner.

In one embodiment, a system is provided that includes a memory and a processing device coupled with the memory, the processing device configured to receive a target image comprising a plurality of pixels, receive a matrix code comprising a plurality of dark cells and a plurality of light cells, associate a first set of pixels of the plurality of pixels of the target image with the dark cells, associate a second set of pixels of the plurality of pixels of the target image with the light cells, and generate a coded image by embedding the matrix code into the target image by darkening the first set of pixels and lightening the second set of pixels.

In yet another embodiment, a non-transitory computer readable storage medium is provided that includes instructions that, when executed by a processor, cause the processor to perform a method comprising receiving a request for a Web page from a client, generating text content in response to the received request, selecting a target image comprising a plurality of pixels, generating a matrix code using the text content, the matrix code comprising a plurality of dark cells and a plurality of light cells, associating a first set of pixels of the plurality of pixels of the target image with the dark cells, associating a second set of pixels of the plurality of pixels of the target image with the light cells, generating a coded image by embedding the matrix code into the target image by darkening the first set of pixels and lightening the second set of pixels, and providing the requested Web page to the client, the requested Web page including the coded image.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
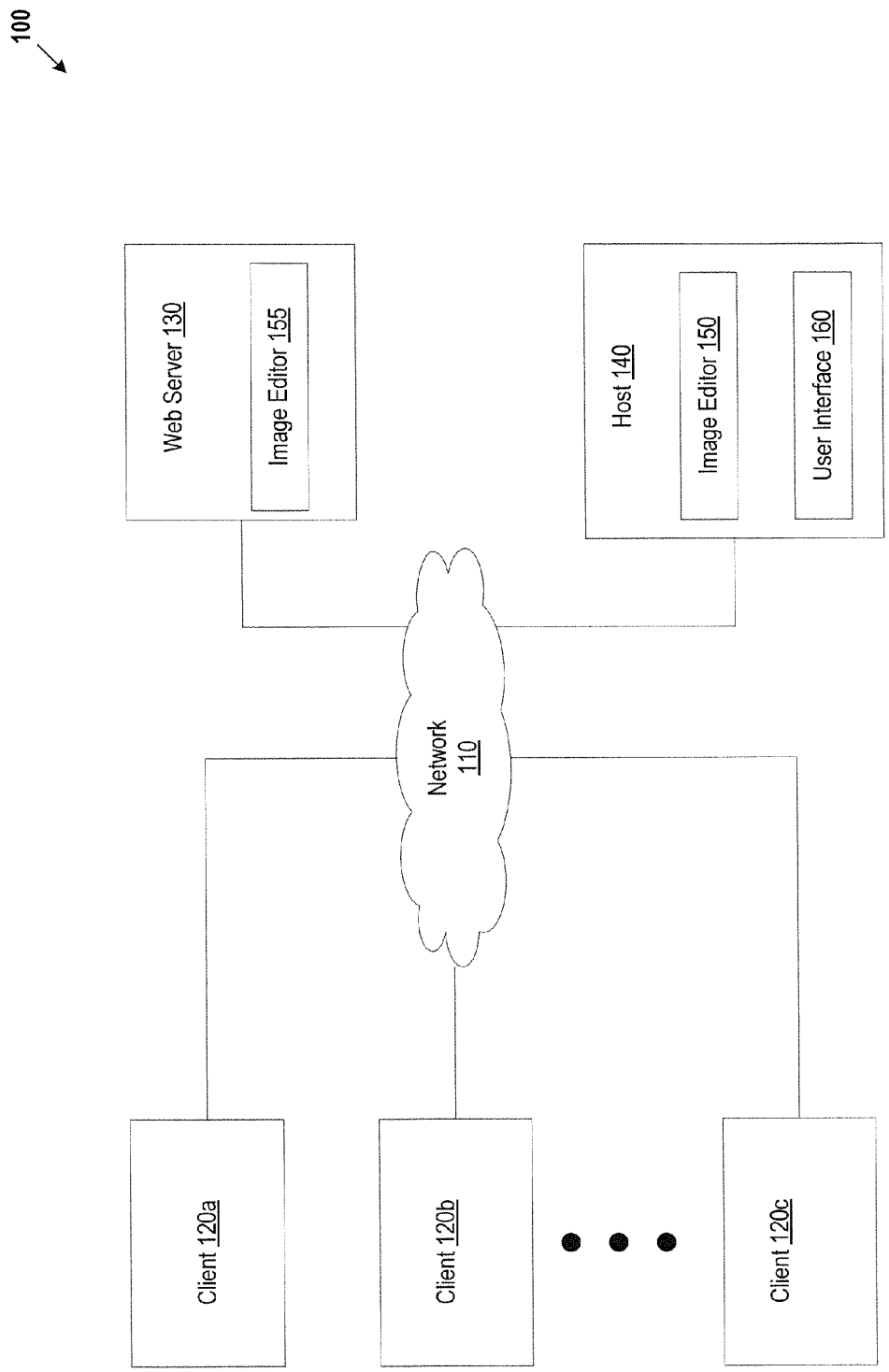
FIG. 1 is a block diagram of one embodiment of an exemplary network architecture including an image editor.

Embodiments of the invention are directed to a method and system for embedding a matrix code into an image. FIG. 1 is an exemplary operating environment 100 in which embodiments of the present invention can be implemented. The operating environment 100 may include one or more client machines 120 and one or more servers—such as server 130—connected to a network 110. Various other appliances may also be connected to the network 110. The operating environment 100 may be the information infrastructure of an enterprise where, for example, the server 130 is a Web server or a mobile application server delivering content to the clients 120, and the network 110 is the Internet. The server 130 may reside on any computing machine including, for example, a server computer, a personal computer, a router, etc. The clients can be any type of computing machine, including, but not limited to a personal computer, a tablet computer, a thin client, a notebook, a laptop computer, a Smartphone or other handheld device, or any other computing device.

The operating environment 100 can also include a host machine 140, which can be any of the types of computing machine listed above for clients 120. In one embodiment, the Server 130 and the host machine 140 may be on a separate local area network from the clients 120. The embodiments of the present invention are not limited to the specific environment 100 shown in FIG. 1, and some embodiments can be implemented without connecting a computer to a network at all.

In one embodiment, the host 140 includes an image editor 150. The image editor 150 may be an independent application, a plugin or a part (e.g., a module or submodule) of another application and can be used to create a coded image by embedding a matrix code into a target image, as described in more detail further below. The coded image with the embedded matrix code can be any image, such as a digital photo, graphic art, a logo or icon, or any other digital image. In other embodiments, non-digital coded images can be created and used as well.

In one embodiment, the image editor 150 provides a user interface 160—such as a graphical user interface (GUI)—that allows a user to select the target image for the image editor 150 and to input content to embed into the target image in the form of a matrix code. The target image may be stored on the host 140, on the server 130 or a server cache, or in some form of networked storage.

The user interface 160 can expose additional functionality of and access to the image editor 150 as set forth further below. In one embodiment, the user interface 160 can also be used to access the image editor 155 application residing on the server 130. In other embodiments, the image editor 155 residing on the server 130 operates autonomously without user input, as described further below. The image editor 155 residing on the server 130 can be identical to the image editor 150 residing on the host 140 or similar thereto. In one embodiment, only one instance of the image editor (either 150 or 155) is used, depending on the desired location for the image editor to reside.

In one embodiment, when a client 120 requests content from the server 130, the server can include a coded image that includes an embedded matrix code. For example, a client 120 can request a Web page for a corporate Website. The server can generate the Web page to include a corporate logo with an embedded matrix code that encodes a uniform resource locator (URL) for a Website featuring a promotion for the corporation's products. Many other such examples are possible.

The coded image can already exist in an encoded form at the time of the request from the client. In that case, the server can retrieve the encoded image from server storage, network storage, or wherever the coded image is stored. In another embodiment, the server 130 generates the coded image in response to the request.

Figure 2:
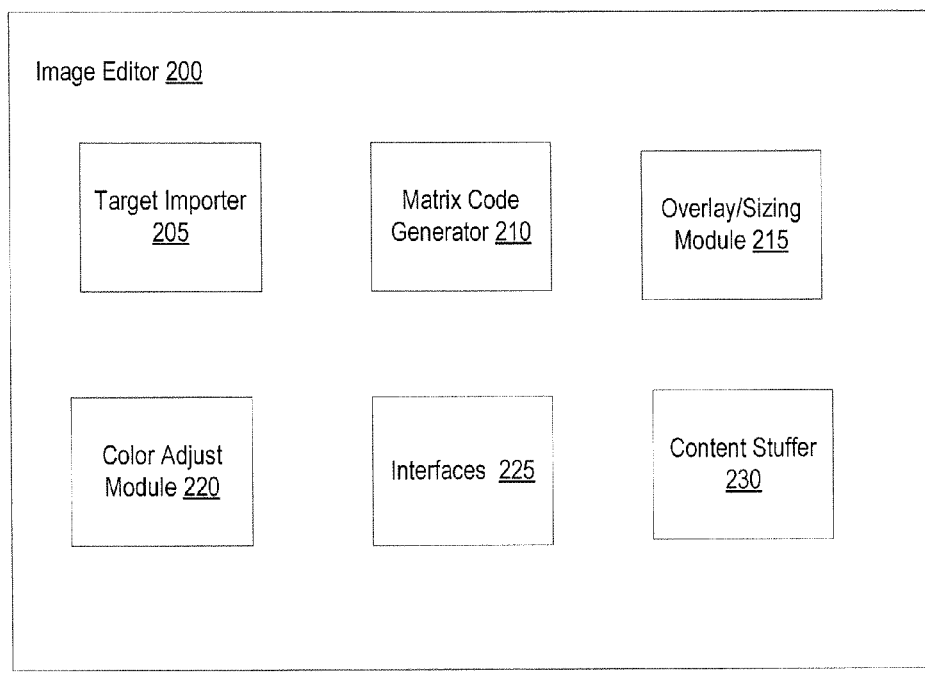
FIG. 2 is a block diagram of one embodiment of an image editor.

FIG. 2 is a block diagram illustrating one embodiment of the image editor 200. The image editor 200 includes a target importer 205 operable to import the target image into the image editor 200. The target image can be a digital photograph, such as a portrait or a scenery, or a graphic image, such as a corporate logo, an icon, graphic art, etc. The target image can be in any image format, such as GIF, JPEG, TIFF, BMP, CGM, or any other digital image format. The target image to be imported can be identified to the target importer 205 by a user selection or an automated process interacting with the image editor via its interfaces 225.

The image editor 200 can also include a matrix code generator 210. The matrix code generator 210 creates the matrix code from content provided to the image editor 200 via its interfaces 225. For example, the content can be provided by a user via the user interface 160 or it can be generated automatically by the host 140 or the server 130. There are numerous commercially and freely available matrix code generators that can be used to generate the matrix code.

In one embodiment, the image editor also includes a content stuffer 230. Before providing the content to be embedded to the matrix code generator 210, the content can be stuffed with "stuffing content" to decrease the size of the matrix code cells. Since more content requires more cells to encode, adding stuffing content to content to be encoded results in a more pixelated matrix code, that is, a matrix code with more cells having smaller surface areas. Content stuffing can be accomplished by adding spaces, space equivalents (such as "%20" to URLs), or other such non-informative characters to the content to be encoded.

In one embodiment, the image editor also includes an overlay or sizing module 215. The overlay/sizing module 215 adjusts the size of the image and/or the matrix code so that the matrix code can be embedded into the target image. In one embodiment, the shape and size of the matrix code is not as adjustable as the target image, and most of the size adjustment and cropping is performed on the target image. The target image can be proportionally increased or decreased in size, and it can be cropped to alter its shape. In one embodiment, the overlay/sizing module 215 is manually operable by a user via interfaces 225 and the user interface 160.

The target image can be made to be the exact size and shape of the matrix code, or it can be larger that the matrix code. In less aesthetically pleasing embodiments, the target image can be smaller than the matrix code. However, in such embodiments, the matrix code will extend past the edges of the target image.

In one embodiment, the embedding of the matrix code into the resized target image is performed by the color adjust module 220. The color adjust module 220 darkens the color of pixels in positions that correspond to black matrix code cells and lightens the color of pixels in positions that correspond to white matrix code cells. In one embodiment, each color is lightened and darkened to a minimum—or recommended—color value or opacity differential distinguishable by a matrix code scanner. In one embodiment, the value of a color defines its relative light or darkness. In one embodiment, this recommended color value or color opacity differential can be color specific or tone specific.

The image editor 200 can also include various interfaces 225 that can interface with other components. For example, interfaces 225 can include an interface to the user interface 160 so that a user can select an image for the target importer 205 or crop the target image using the overlay/sizing module 215. Other interfaces 225 can interact with local components of the host 140, such as the operating system, file system, memory, ect., or networked components, such as network storage or the server 130.

Figure 3A:
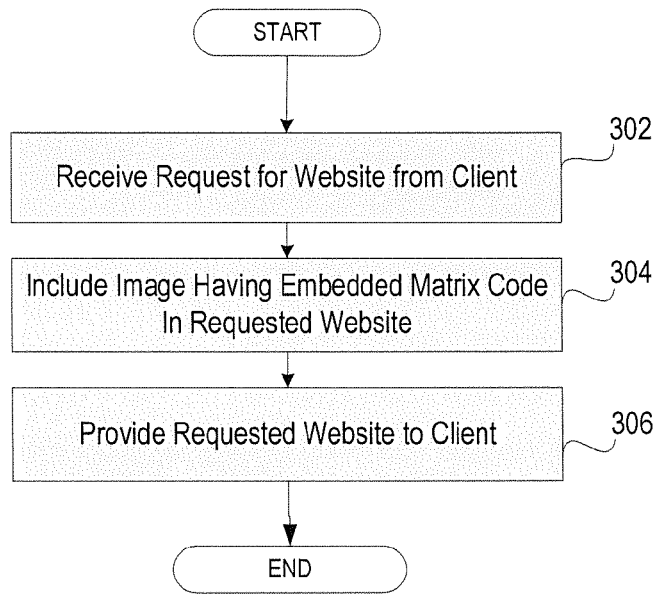
FIG. 3A is a flow diagram of an embodiment of a method for including a coded image in a Website.

FIG. 3A is a flow diagram of one embodiment of a method for providing a Website that includes an image with an embedded matrix code. The method is performed by processing logic that may comprise hardware (circuitry, dedicated logic, etc.), software (such as is run on a general purpose computer system or a dedicated machine), or a combination of both. In one embodiment, the method is performed by the server 130 of FIG. 1.

Referring to FIG. 3A, processing logic begins by receiving a request for a Website from a client device at block 302. The request can be an HTTP request for an HTML Web site, an FTP request, or any other standard request. At block 304, the server includes a coded image having an embedded matrix code in the requested Website. The coded image may already be encoded in the HTML or other code of the Website. In other embodiments, the server 130 determines that the coded image should be included dynamically. At block 306, the requested website including the coded image is provided to the client. The client can then use a Web browser, mobile app, or similar tool to display the provided Website and the coded image. The coded image can then be scanned by a matrix code scanner.

Figure 3B:
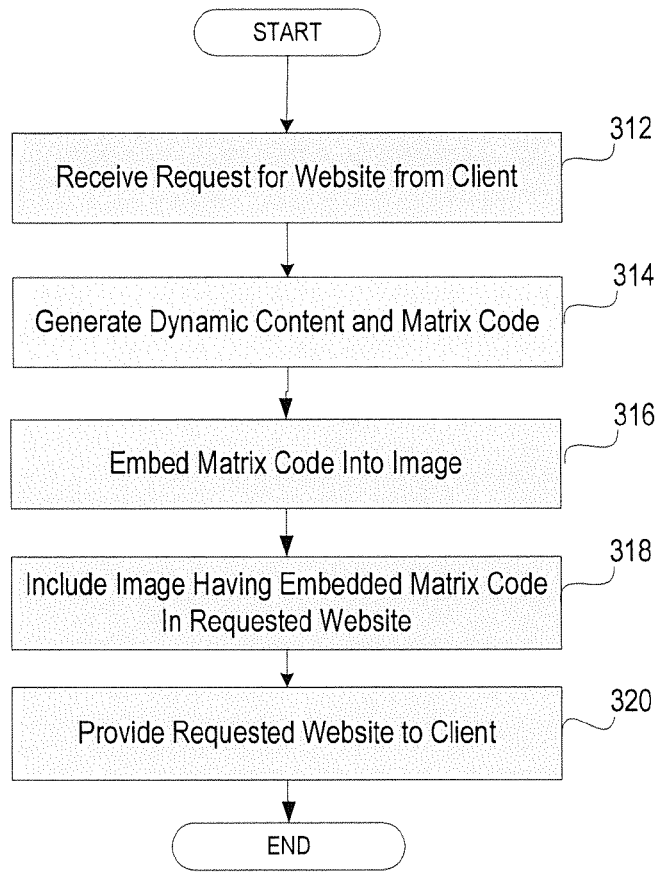
FIG. 3B is a flow diagram of an embodiment of a method for including a coded image having dynamic content in a Website.

FIG. 3B is a flow diagram of one embodiment of a method for providing a Website that includes an image with dynamic content embedded as a matrix code. The method is performed by processing logic that may comprise hardware (circuitry, dedicated logic, etc.), software (such as is run on a general purpose computer system or a dedicated machine), or a combination of both. In one embodiment, the method is performed by the server 130 of FIG. 1.

Referring to FIG. 3B, processing logic begins by receiving a request for a Website from a client at block 312. At block 314, the server generates dynamic content to be embedded into an image. In one embodiment, generating dynamic content can be the selection of one piece of content from a list of available options. For example, the dynamic content can be a promotion associated with the user. For example, if the user has visited the site with some threshold frequency, then the user may receive a different promotion from a user visiting the site less often. Many other sources of dynamic content can be used, and the content can be related to factors such as user identity, client identity, time of day/month/year, unique visitor count, or any other factor.

At block 316, the server uses the image editor to embed a matrix code encoding the dynamic content into a target image to be included in the Website. The image editor can generate the matrix code from the dynamic content, or the server can use another component to perform matrix code generation. Then, the coded image is included in the requested Website, at block 318. At block 320, the server provides the Website to the client, as set forth above.

Figure 4:
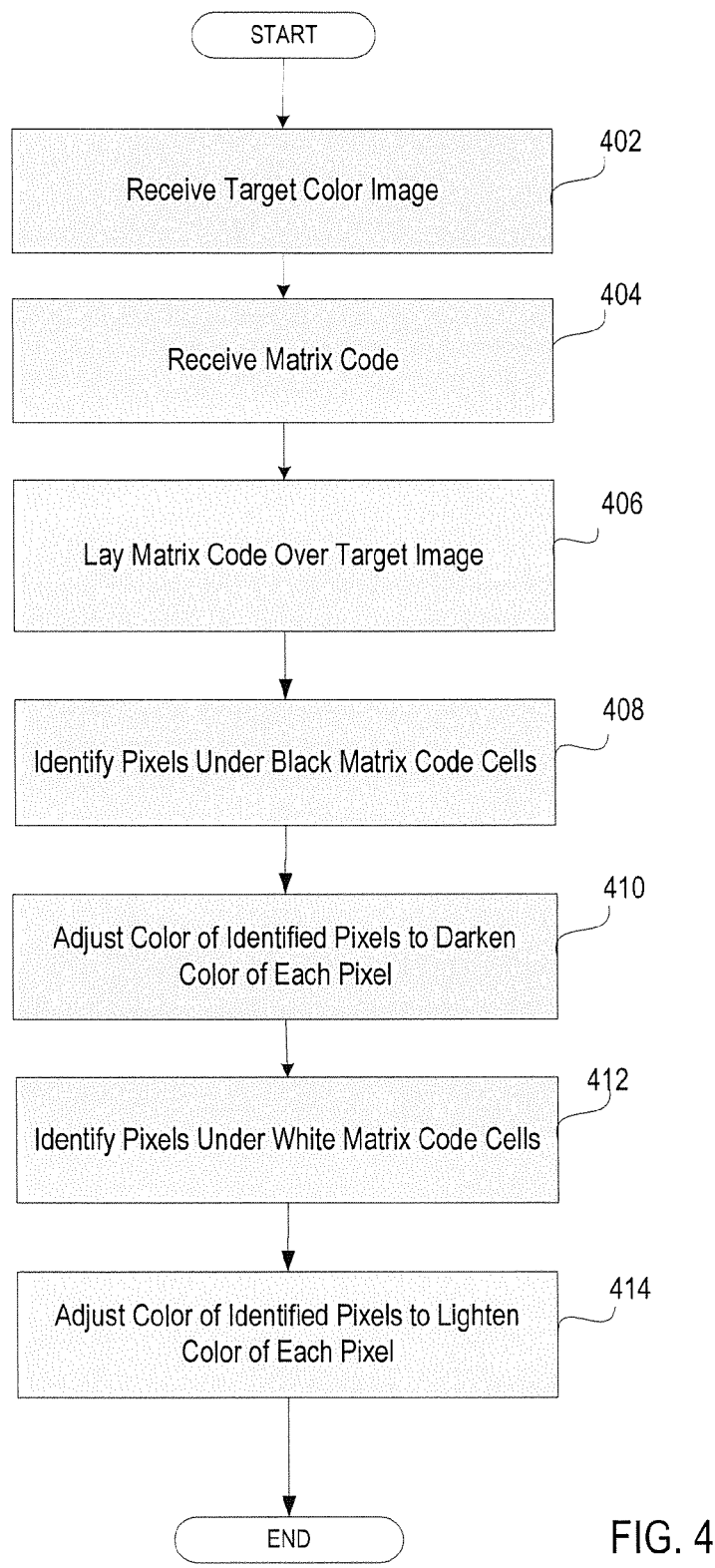
FIG. 4 is a flow diagram of an embodiment of a method for embedding a matrix code into a target image.

FIG. 4 is a flow diagram of one embodiment of a method for embedding a matrix code into an image. The method is performed by processing logic that may comprise hardware (circuitry, dedicated logic, etc.), software (such as is run on a general purpose computer system or a dedicated machine), or a combination of both. In one embodiment, the method is performed by the image editor 150 or image editor 155 of FIG. 1.

Referring to FIG. 4, processing logic begins by receiving a target color image at block 402. The target image can be in any image format, such as JPEG, GIF, TIFF, CGM, PNS, or any other digital image storage format. The target image can use any color model and color space, such as the RGB color model, the CMYK color model, or any other color model. In one embodiment, receiving the target image includes receiving a user selection of the target image from a set of images stores in an image storage or repository.

At block 404, the matrix code is received. The matrix code can be generated from content provided by a user or from pre-existing content. Any available or custom matrix code generator can be used to generate the matrix code. The matrix code is a matrix of black and white cells. In one embodiment, each cell has a square shape. The number of cells depends on the amount of content/information encoded into the matrix code.

At block 406, the matrix code is laid over the target image. Both the matrix code and the target image may be resized and the target image may be cropped. In one embodiment, laying the matrix code over the target image is done in a way that makes the target image the same size and shape as the matrix code. In another embodiment, the overlaying is done in a manner that ensures that the matrix code is fully within the size and shape of the target image (where the target image may be larger than the matrix code).

At block 408, the pixels of the target image that are located "under" the black cells of the matrix code are identified. In one embodiment, a pixel is under a black cell if the position of the pixel in the target image corresponds with the location of a black cell in the matrix code. Such identified pixels will sometimes be referred to as the "dark pixels" or the "black pixels."

At block 410, the color of the identified dark pixels is adjusted to darken these pixels. In one embodiment, pixels are darkened by decreasing the opacity of each pixel by some amount, if such an adjustment is available to the image editor. For example, the opacity of the dark pixels can be decreased to some fixed percentage that is transparent enough for the overlaid black cell to alter each color to register as a black area of the matrix code. Alternately, all color components of the color model can be darkened by some amount. For example, in an RBG (red-blue-green) color model, each component R, B, and G can be made a darker shade by a predetermined percentage, or to a predetermined value sufficient to allow a matrix code scanner to identify the cell as a "black cell."

At block 412, the pixels of the target image that are located "under" the white cells of the matrix code are identified. In one embodiment, a pixel is under a white cell if the position of the pixel in the target image corresponds with the location of a white cell in the matrix code. Such identified pixels will sometimes be referred to as the "light pixels" or the "white pixels."

At block 414, the color of the identified light pixels is adjusted to lighten these pixels. In one embodiment, pixels are darkened by decreasing the opacity (i.e., increasing the transparency) of each pixel by some amount, if such an adjustment is available to the image editor. For example, the opacity of the light pixels can be decreased to some fixed percentage that is light enough for each color to register as a white area of the matrix code. Alternately, all color components of the color model can be lightened by some amount. For example, in an RBG color model, each component R, B, and G can be made a lighter shade by a predetermined percentage, or to a predetermined value sufficient to allow a matrix code scanner to identify the cell as a "white cell." The resulting coded image maintains the visual information and basic appearance of the original target image, but has lightened and darkened areas corresponding to the black and white cells of the matrix code that is embedded into the target image.

In one embodiment, the processing described with reference to FIG. 4 is modified by first identifying objects in the target image, prior to the color adjustment of blocks 408-414. Some images can contain white or empty spaces between objects. An object can be a figure, a person, an icon, a logo, or any other object that is included in the target image. For example, an image of Mickey Mouse and Donald Duck can have each of them as separate objects. In one embodiment, pixels representing objects are identified, as are pixels representing empty space. In one embodiment, the color modification described with reference to blocks 408-414 is only performed on the pixels representing objects. In another embodiment, the color modification described with reference to blocks 408-414 is only performed on the pixels representing empty space.

Figure 5:
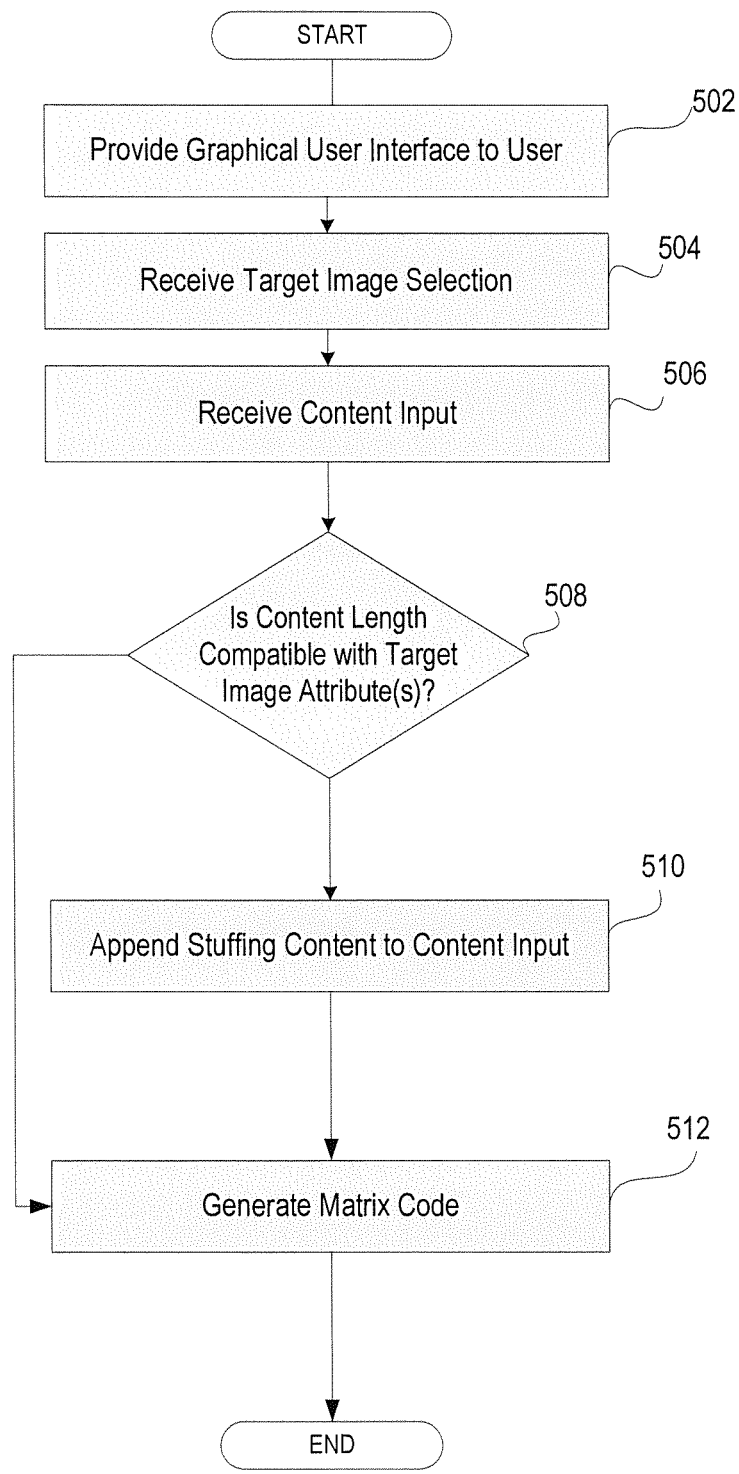
FIG. 5 is a flow diagram of an embodiment of a method for content stuffing prior to matrix encoding.

FIG. 5 is a flow diagram of another embodiment of a method for embedding a matrix code into an image. The method is performed by processing logic that may comprise hardware (circuitry, dedicated logic, etc.), software (such as is run on a general purpose computer system or a dedicated machine), or a combination of both. In one embodiment, the method is performed by the image editor 150 or image editor 155 of FIG. 1.

Referring to FIG. 5, processing logic begins by providing a graphical user interface (GUI) to the user of the system at block 502. The GUI allows the user to browse through images stored in various local or networked image repositories and to select the target image therefrom. The selection of the target image by the user is received by the system in block 504, the selection identifying the selected target image. The target image can have various attributes, such as encoding, resolution, data size, physical size, dimension, color space, and so on.

In one embodiment, the GUI also enables the user to input the content that is to be encoded into a matrix code, which is then embedded into the target image. The GUI can provide a text input or entry field and an adjacent button, which when pressed, generates the matrix code from the text input (similar to the GUI of a matrix code generator).

The size of the cells of matrix codes is inversely proportional to the amount of data to be encoded. The more data to be encoded, the more cells are used, thus decreasing the size of the cells. Generally, larger cells are easier for matrix code scanner to read, and matrix code generator encode using as few cells as possible for a given size of data. However, in one embodiment, having smaller cells produces a more visually pleasing coded image when the matrix code is embedded into the target image.

Thus, in block 506, content input is received. In one embodiment, the content input can be entered by a user via the GUI. In another embodiment, the content input is automatically generated by the system. In block 508, a determination is made about whether the length of the content—i.e., the amount of data to be encoded into the matrix code—is compatible with one or more attributes of the target image. These attributes can include the size and resolution of the target image. Furthermore, such attributes can include an analysis of the size of the shapes represented in the target image.

If the length of the content to be encoded is found to be compatible with the relevant attributes of the target image, then, in block 512, the matrix code is generated. The matrix code can then be embedded into the target image as described, for example, with reference to FIG. 4. If, however, the length of the content to be encoded is found to be incompatible with the relevant attributes of the target image, then, in block 510, stuffing content is generated and appended to the content input.

In one embodiment, the system characterizes the content input to generate the appropriate type of stuffing content. In one embodiment, the stuffing content does not alter the meaning of appearance of the content input. Thus, in the content is plain text, adding space characters to the end of the text can stuff the text without visually altering it. However, if the content input is characterized as a URL, then the stuffing content generated is the hexadecimal equivalent of the space character, namely "%20."

The quantity of stuffing content generated is selected to make the stuffed content (the result of appending the content input to the stuffing content) of such a length that it is compatible with the relevant attribute or attributes of the target image, as determined in block 508. Once the stuffed content is compatible with the relevant attributes of the target image, the matrix code is generated in block 512. The matrix code can then be embedded into the target image as described, for example, with reference to FIG. 4.

Figure 6:
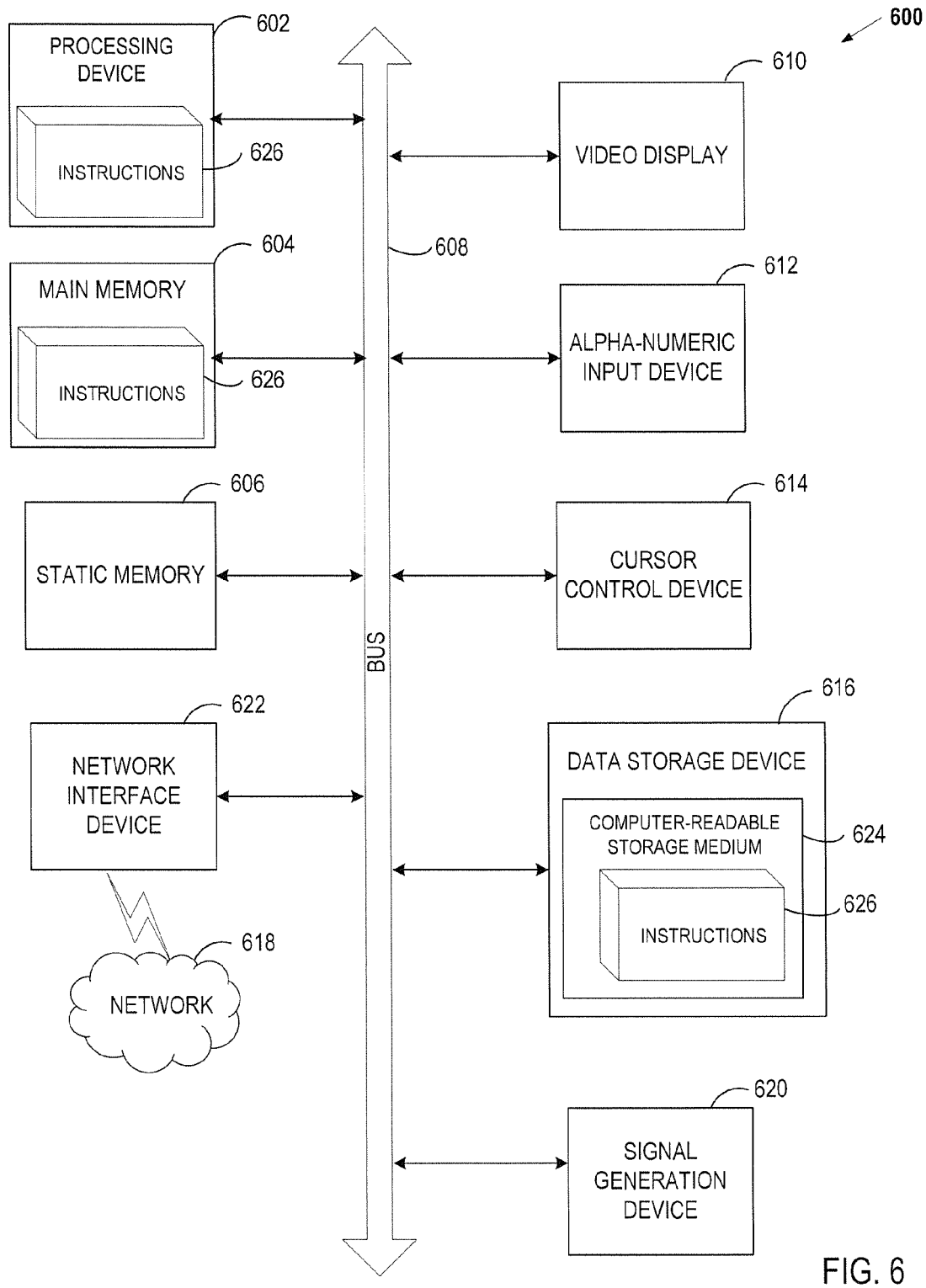
FIG. 6 is a diagram of one embodiment of a computer system that can be used to implement embodiments of the present invention.

FIG. 6 is a diagram of one embodiment of a computer system that can be used to implement one of the client/host machines, such as client 120, server 130, or host 140 as described above. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. The instructions 626 may further be transmitted or received over a network 618 via the network interface device 622.

The computer-readable storage medium 624 may also be used to store the instructions 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 626, components and other features described herein (for example in relation to FIG. 1A-C) can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in any combination hardware devices and software components.

Figure 7:
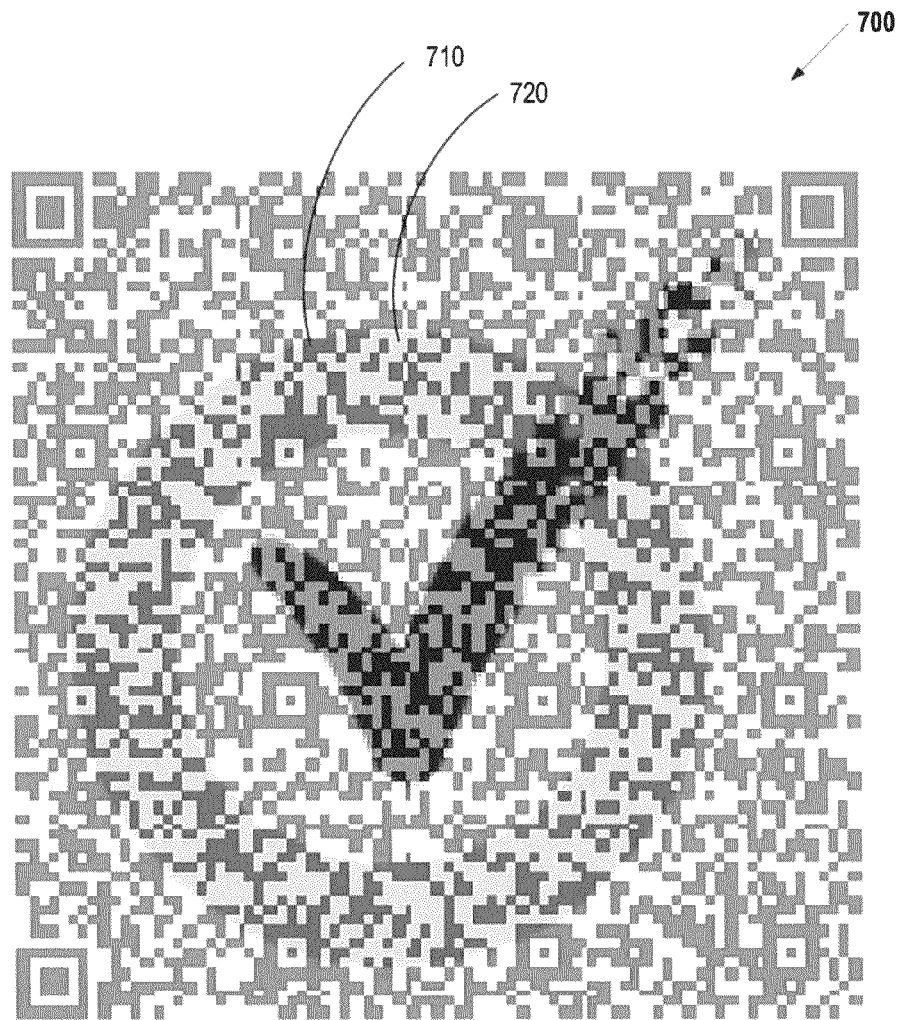
FIG. 7 is an example image having an embedded matrix code according to one embodiment of the present invention.

An example of a coded image 700 having an embedded matrix code is shown in FIG. 7. FIG. 7 shows only one specific example using a QR code. In the example of FIG. 7, the target image was a corporate logo consisting of a black checkmark in a yellow circle on a white background. As can be seen in FIG. 7, some areas of the yellow circle (as well as the black checkmark and the white background) have been lightened to correspond with light cells of the QR code 710 and some areas of the yellow circle (as well as the black checkmark and the white background) have been darkened to correspond with light cells of the QR code 720. It can be seen that the dark cells of the white background appear grey, and the light cells of the black checkmark also appear grey, although they are not necessarily the same shade of grey, and will be different shades of grey in most embodiments.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining," "determining," "generating," "modifying," "decreasing," "increasing," "collecting," "creating," "assigning," "storing," "searching," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus maintaining virtualization context isolation for out-of-process services is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a target image comprising a plurality of pixels;
receiving content to be encoded into a matrix code;
modifying the content based on an attribute of the target image;
receiving the matrix code comprising a plurality of dark cells and a plurality of light cells, wherein the matrix code is based on the content that has been modified based on the attribute of the target image;
associating a first set of pixels of the plurality of pixels of the target image with the dark cells;
associating a second set of pixels of the plurality of pixels of the target image with the light cells; and
generating a coded image by embedding the matrix code into the target image by darkening the first set of pixels and lightening the second set of pixels.

2. The method of claim 1, further comprising:
including the coded image in a file representing a Web page; and
providing the Web page to a client device in response to a request for the Web page.

3. The method of claim 1, further comprising providing a user interface to a user, wherein the user interface allows the user to select the target image from a plurality of images.

4. The method of claim 3, wherein the user interface allows the user to input the content to be encoded into the matrix code, wherein the method further comprises generating the matrix code using the content.

5. The method of claim 4, further comprising appending stuffing content to the content input by the user to increase the size of the content to be encoded into the matrix code.

6. The method of claim 1, further comprising:
receiving a request for a Web page from a client device;
generating the content to be encoded into the matrix code using the received request; and
generating the matrix code using the generated content.

7. The method of claim 1, wherein darkening the first set of pixels and lightening the second set of pixels comprises creating a color value differential between the first set of pixels and the second set of pixels that is distinguishable to a matrix code scanner.

8. A system comprising:
a memory; and
a processing device coupled with the memory to:
receive a target image comprising a plurality of pixels;
receive content to be encoded into a matrix code;
modify the content based on an attribute of the target image;
receive the matrix code comprising a plurality of dark cells and a plurality of light cells, wherein the matrix code is based on the content that has been modified based on the attribute of the target image;
associate a first set of pixels of the plurality of pixels of the target image with the dark cells;
associate a second set of pixels of the plurality of pixels of the target image with the light cells; and
generate a coded image by embedding the matrix code into the target image by darkening the first set of pixels and lightening the second set of pixels.

9. The system of claim 8, wherein the processing device is further to:
include the coded image in a file representing a Web page; and
provide the Web page to a client device in response to a request for the Web page.

10. The system of claim 8, wherein the processing device is further to provide a user interface to a user of the system, wherein the user interface allows the user to select the target image from a plurality of images.

11. The system of claim 10, wherein the user interface provided by the processing device allows the user to input the content to be encoded into the matrix code, and wherein the processing device is further to generate the matrix code using the content.

12. The system of claim 11, wherein the processing device is further to append stuffing content to the content input by the user to increase the size of the content to be encoded into the matrix code.

13. The system of claim 8, wherein the processing device is further to:
receive a request for a Web page from a client device;
generate the content to be encoded into the matrix code using the received request; and
generate the matrix code using the generated content.

14. The system of claim 8, wherein the processing device is further to darken the first set of pixels and lightens the second set of pixels by creating a color value differential between the first set of pixels and the second set of pixels that is distinguishable to a matrix code scanner.

15. A non-transitory computer readable storage medium including instructions that, when executed by a processing device, cause the processing device to perform operations comprising:
receiving a request for a Web page from a client;
generating text content in response to the received request;
selecting a target image comprising a plurality of pixels;
modifying the text content based on an attribute of the target image;
generating a matrix code using the modified text content, the matrix code comprising a plurality of dark cells and a plurality of light cells;
associating a first set of pixels of the plurality of pixels of the target image with the dark cells;
associating a second set of pixels of the plurality of pixels of the target image with the light cells;
generating a coded image by embedding the matrix code into the target image by darkening the first set of pixels and lightening the second set of pixels; and
providing the requested Web page to the client, the requested Web page including the coded image.

16. The non-transitory computer readable storage medium of claim 15, wherein the operations further comprise providing a user interface to a user, wherein the user interface allows the user to select the target image from a plurality of images.

17. The non-transitory computer readable storage medium of claim 16, wherein the user interface allows the user to input content to be encoded into the matrix code, wherein the operations further comprise generating the matrix code using the content.

18. The non-transitory computer readable storage medium of claim 15, wherein the operations further comprise appending stuffing content to the generated content to increase the size of the content to be encoded into the matrix code.

19. The non-transitory computer readable storage medium of claim 15, wherein darkening the first set of pixels and lightening the second set of pixels comprises creating a color value differential between the first set of pixels and the second set of pixels that is distinguishable to a matrix code scanner.

* * * * *